(12) United States Patent
Wang et al.

(10) Patent No.: US 11,991,638 B2
(45) Date of Patent: May 21, 2024

(54) MANAGING AGGREGATED NODE GROUP POWER STATES

(71) Applicant: Hewlett-Packard Development Company, L.P., Spring, TX (US)

(72) Inventors: Qiwei Wang, Palo Alto, CA (US); Tyler Sims, Corvallis, OR (US); William Allen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 225 days.

(21) Appl. No.: 17/424,593

(22) PCT Filed: Apr. 30, 2019

(86) PCT No.: PCT/US2019/030079
§ 371 (c)(1),
(2) Date: Jul. 21, 2021

(87) PCT Pub. No.: WO2020/222833
PCT Pub. Date: Nov. 5, 2020

(65) Prior Publication Data
US 2022/0095236 A1    Mar. 24, 2022

(51) Int. Cl.
*H04W 52/02* (2009.01)
*G01S 7/41* (2006.01)
*G01S 13/00* (2006.01)
*G06Q 10/08* (2023.01)
*H04W 84/18* (2009.01)

(52) U.S. Cl.
CPC ......... *H04W 52/0254* (2013.01); *G01S 7/412* (2013.01); *G01S 13/003* (2013.01); *G06Q 10/08* (2013.01); *H04W 84/18* (2013.01)

(58) Field of Classification Search
CPC ... H04W 52/0254; H04W 84/18; G01S 7/412; G01S 13/003; G06Q 50/28; G06Q 10/087; H02J 50/40; H02J 50/90; G08C 17/00
See application file for complete search history.

(56) References Cited

U.S. PATENT DOCUMENTS

| | | | |
|---|---|---|---|
| 7,653,386 | B2 | 1/2010 | Bennett |
| 7,899,006 | B2 | 3/2011 | Boyd |
| 8,026,814 | B1 | 9/2011 | Heinze et al. |
| 8,339,244 | B2 | 12/2012 | Peden, II et al. |
| 8,896,442 | B1 | 11/2014 | Khan et al. |

(Continued)

FOREIGN PATENT DOCUMENTS

| | | |
|---|---|---|
| CN | 101299699 A | 11/2008 |
| CN | 104769766 A | 7/2015 |

(Continued)

*Primary Examiner* — Farid Seyedvosoghi
(74) *Attorney, Agent, or Firm* — Michael Dryja

(57) ABSTRACT

Managing aggregated node group power states. A reflected energy device may transmit energy to one of multiple aggregated node groups. Each aggregated node group includes multiple device nodes. The aggregated node group may be moved from one location to another. The transmitted energy is reflected to detect occurrence of a state change condition. A communication device such as the reflected energy device or an anchor node then instructs device node(s) of the aggregated node group to enter a high power state and to enter a low power state.

14 Claims, 5 Drawing Sheets

(56) References Cited

U.S. PATENT DOCUMENTS

| | | | |
|---|---|---|---|
| 9,328,857 B2 | 5/2016 | Conte et al. | |
| 9,692,260 B2 | 6/2017 | Walsh et al. | |
| 2003/0063585 A1 | 4/2003 | Younis et al. | |
| 2006/0067286 A1* | 3/2006 | Cornett | H04L 63/107 370/338 |
| 2007/0259659 A1* | 11/2007 | Bennett | H04W 52/322 455/422.1 |
| 2008/0267121 A1 | 10/2008 | Lee et al. | |
| 2012/0147531 A1* | 6/2012 | Rabii | H04W 52/0254 361/679.01 |
| 2014/0103734 A1* | 4/2014 | Walsh | G01R 1/20 307/104 |
| 2016/0112216 A1* | 4/2016 | Sargent | G07C 5/008 370/328 |
| 2016/0336804 A1 | 11/2016 | Son et al. | |
| 2017/0085127 A1* | 3/2017 | Leabman | H02J 50/80 |
| 2017/0192435 A1 | 7/2017 | Bakhishev et al. | |
| 2018/0014151 A1 | 1/2018 | Kratz et al. | |
| 2018/0196972 A1 | 7/2018 | Lu et al. | |
| 2018/0332434 A1 | 11/2018 | Kulkarni et al. | |
| 2020/0106305 A1 | 4/2020 | Calhoun et al. | |

FOREIGN PATENT DOCUMENTS

| | | |
|---|---|---|
| CN | 106877909 A | 6/2017 |
| RU | 2486709 C2 | 6/2013 |

\* cited by examiner

MANAGING AGGREGATED NODE GROUP POWER STATES

BACKGROUND

Asset tracking systems often utilize tracking devices to manage, locate and track assets. Such systems find use in inventory control management, loss prevention, etc.

DETAILED DESCRIPTION

Reference will now be made in detail to the examples of the disclosure, examples of which are illustrated in the accompanying drawings. While the disclosure will be described in conjunction with examples, it will be understood that the examples are not intended to limit the disclosure to these examples. On the contrary, the disclosure is intended to cover alternatives, modifications and equivalents which may be included within the scope of the disclosure as defined by the appended claims. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well-known methods, procedures, components, and circuits have not been described in detail as to not unnecessarily obscure aspects of the present disclosure.

The present disclosure relates to managing the power states of aggregated node groups. The aggregated node groups facilitate the tracking of assets associated with the aggregated node groups. A reflected energy device may sense energy reflected by an aggregated node group, and the reflected energy device may transmit energy to the aggregated node group. Each aggregated node group might include multiple device nodes. In some instances, hundreds or thousands of such device nodes might be physically clustered in an aggregated node group. Each aggregated node group can also be relocated.

The energy transmitted to the aggregated node group is reflected and sensed by the reflected energy device to detect occurrence of a state change condition. This state change condition might be physical movement of the aggregated node group. When a state change condition is detected, a reflected energy device may instruct the device nodes of the aggregated node group to enter a higher power state (or a different power state). In another example, the power state change instructions to the device nodes are relayed by an anchor node. The power state change instructions may also be from a separate communication device within the network. Note that when a device node is already in the desired power stated, the power state change command does not change the power state of the device node.

Figure 1:
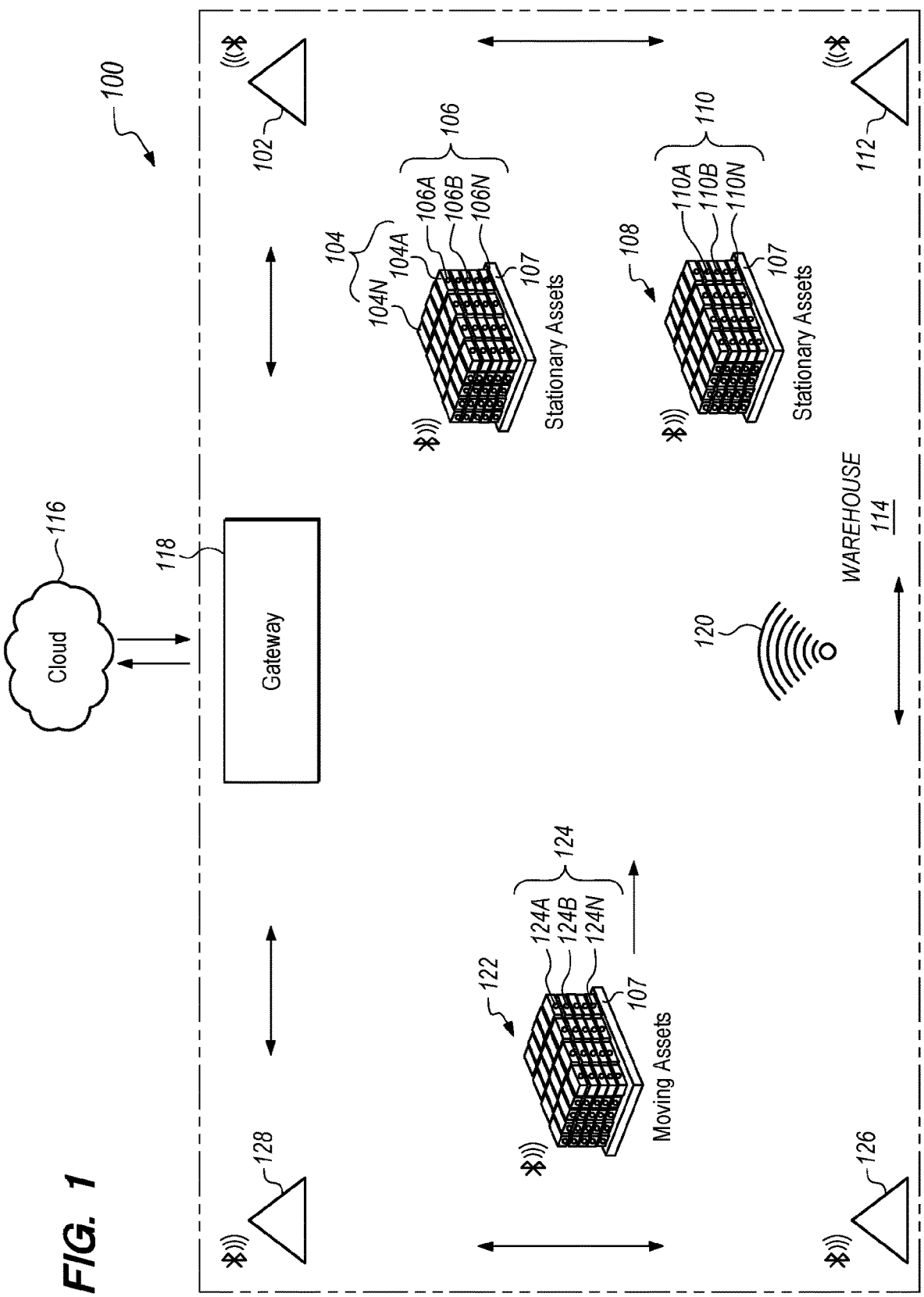
FIG. 1 illustrates an example asset management system according to the present disclosure.

FIG. 1 illustrates an example asset management system 100 according to the present disclosure.

In FIG. 1, asset management system 100 includes four anchor nodes 102, 112, 126 and 128 that are communicably coupled to aggregated node groups 106, 110 and 124. Each anchor node 102, 112, 126 and 128 might be a physical element with wireless communication capabilities. Each anchor node 102, 112, 126 and 128 also has a unique ID (identification) that can be exchanged to facilitate management of aggregated node groups 106, 110 and 124. The anchor nodes may also have an external power supply to operate in a high capability state.

As shown, anchor nodes 102, 112, 126 and 128 are stationary with known coordinates. In this example, anchor nodes 102, 112, 126 and 128 are positioned around the periphery of a warehouse 114 specifically at the corners of the warehouse. This positioning facilitates determining the absolute location of aggregated node groups 106, 110, and 124 and their device nodes. The positioning also maximizes communication dispersion between the anchor nodes 102, 112, 126 and 128 and aggregated node groups 106, 110 and 124. The positioning and the number of anchor nodes can vary depending upon the warehouse layout and the particular implementation.

Although anchor nodes are referred to as being stationary, an anchor node can be mobile. For example, an anchor node may be incorporated in a robot that moves around the warehouse. Such a movable anchor node facilitates a dynamically flexible zone of operation. Further, if for instance, a weak link in the infrastructure nodes exist or an anchor node becomes damaged or has low power life, a movable robot with an on-board anchor node can replace the damage anchor node in the mesh to restore network health.

Referring to FIG. 1, asset management system 100 also includes aggregated node groups 106, 110 and 124, each respectively associated with assets 104, 108 and 122. By "associated with," it is meant that each device node of aggregated node group 106, 110 and 124 is functionally or physically integrated into a corresponding asset. For example, device node 106A is physically integrated or attached to asset 104A.

Here, assets 104, 108 and 122 may be any tangible device, the location of which is to be tracked. In this example, assets may be supply chain consumables such as printer cartridges that are to be tracked. Such assets 104, 108 and 122 may be physically clustered onto pallets 107 and can be moved (via forklift).

The assets may be disaggregated (possibly multiple times) as part of a larger process. It is possible to find hundreds or even thousands of such assets aggregated onto multiple pallets 107, each holding 5,000 packages (for example) and each package/asset having a corresponding device node.

When thousands of device nodes are concentrated in a small volume, likelihood of channel collision increases. Many of the concentrated nodes cannot be detected due to channel collision. Such device nodes may transmit contemporaneously without synchronization so that asset tracking via such device nodes is limited and unreliable. Asset management system 100 of the present disclosure may be employed to track movement and provenance of assets 104, 108 and 122 in a global supply chain without high channel collision.

Referring to FIG. 1, each aggregated node group 106, 110 and 124 includes multiple device nodes physically clustered in close proximity to each other. That is, each aggregated node group 106, 110 and 124 is a set of device nodes. As an example, aggregated node group 106 includes multiple device nodes 106A, 106B, . . . 106N. As another example, aggregated node group 110 includes multiple device nodes 110A, 110B, . . . 110N. And aggregated node group 124 similarly includes plural device nodes 124A, 124B . . . 124N.

Here, a device node (e.g., 106A, 110A, 124A) is a physical element with wireless communication capabilities. Thus, device nodes may communicate with the four anchor nodes 102, 112, 126 and 128. Each device node may have an on-board energy supply such as a battery as well as a unique identification that can be exchanged to facilitate device node management. The device nodes and aggregated node groups 106, 110, 124 may be moved from one location to another.

A device node has at least two operational states. In a first lower power state, the device node can allocate fewer communication resources, can be in an idle or standby state or sleep mode. In one example of this state, the device node has lower capabilities, takes no action, and may simply await an instruction signal to enter another state. A second and higher power operating state can allocate communication resources to increase frequency of RSSI (received signal strength indicator) measurements. In this state, the device node is awake to communicate with other neighboring device nodes and with the anchor nodes.

Note that device nodes may also have roles that allow the function of each device node to vary in the mesh for operational reasons. Within these roles, the device nodes have different power states to enable a different function.

In accordance with examples of the present disclosure, asset management system 100 can dynamically manage these power states by causing the second higher power operating state to only occur, as in this example, when a predetermined state change condition is met. Otherwise, the device node remains in the first lower power state, and in this manner, the life span of on-board batteries of device nodes is significantly increased. In one example, an on-board battery lifespan might be increased from days or months to a few years.

In FIG. 1, aggregated node groups 106, 110, 124 can also form a mesh network between the device nodes and anchor nodes 102, 112, 126 and 128 as further described with reference to FIG. 4. Communication between device nodes in the mesh network might be via Bluetooth LE (low energy), 802.15.4, Wi-Fi, or other wireless mesh protocols. Communication between device nodes of aggregated node groups 106, 110 and 124 and anchor nodes 102, 112, 126 and 128 can also be via Bluetooth LE. The present disclosure significantly reduces channel collision because communication signals are spatially and temporally synchronized so that systems such as Bluetooth can be selected as a design option.

Referring now to FIG. 1, asset management system 100 also includes reflected energy device 120 communicably coupled to gateway 118 and cloud 116. Reflected energy device 120 is a stationary communication device with a fixed location within or proximate to a zone of operation (see FIG. 2). Reflected energy device 120 can sense energy reflected from device nodes 106, 110 and 124. This information is used to aid in precisely determining the absolute position of device nodes and their associated assets. Reflected energy device 120 can power the devices up from low state with the energy that is emitted onto the targeted object. Thereafter, the reflected energy device 120 can sense the reflected energy image and perform signal processing to cause actions for determining position, content verification, and other available outputs/signal state changes from the reflected energy data.

In one example, reflected energy device 120 might be an optical camera. Such camera units may have an integrated light source or the light source may be an overhead light. Here, each asset (e.g., 104A) might include a mark that is detectible by reflected energy device 120. Reflected energy device 120 can also generate spatial information regarding detected items in the field of view. For example, this generation may occur with multiple reflected energy device sensors working cooperatively, via computer vision algorithms for stereo image processing to gain depth information.

An example of an array with beam steering radar that may be applied to obtain spatial information has the following elements: mapping location of tagged objects as a reference down to cm resolution; ability to power up items when the energy paints the objects but otherwise will not powerup the space around unpainted objects.

Use and operation of asset management system 100 will now be described with reference to FIG. 2.

Figure 2:
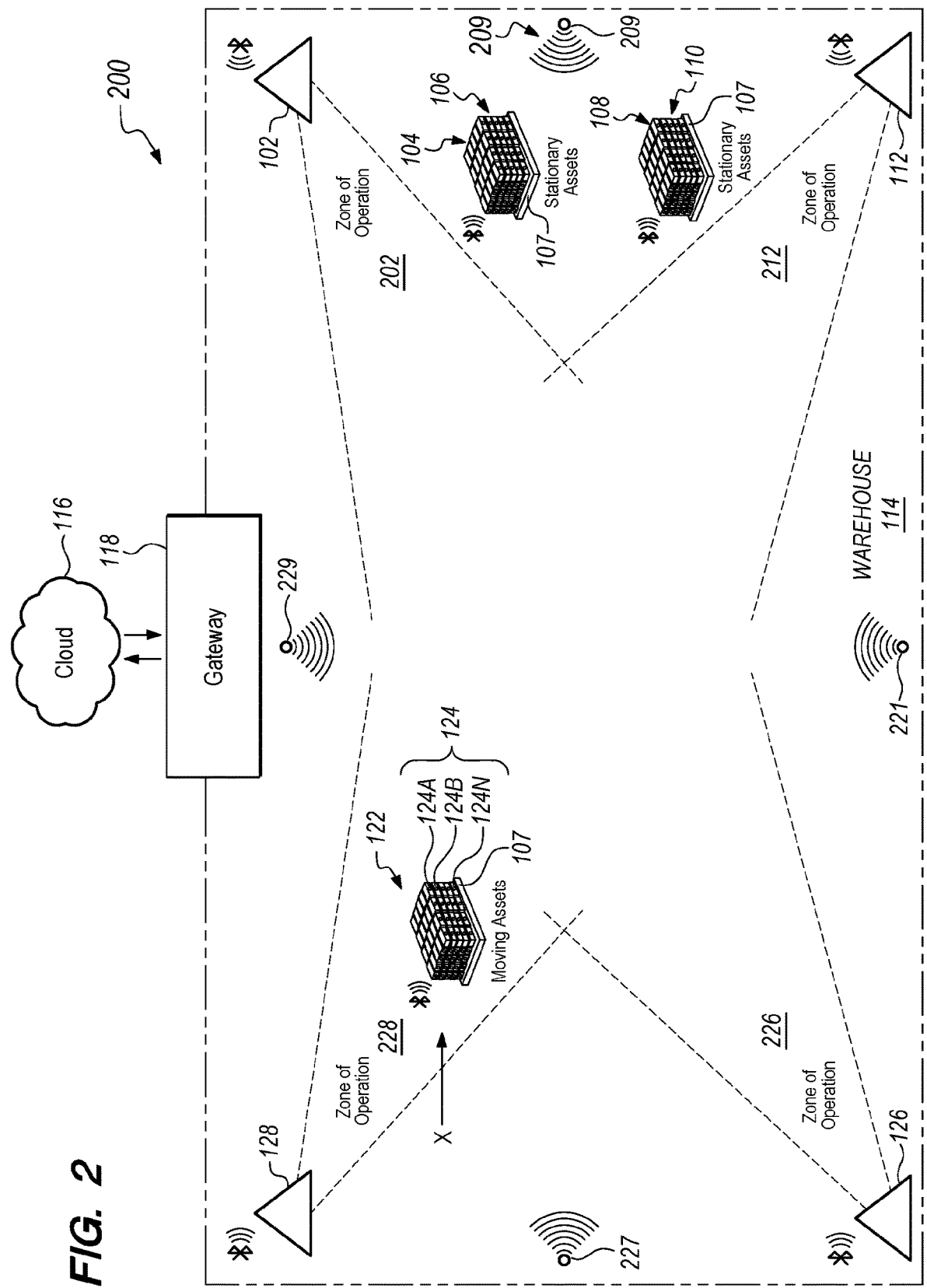
FIG. 2 illustrates another example asset management system according to the present disclosure.

FIG. 2 illustrates an example asset management system 200 according to the present disclosure.

Unlike FIG. 1 in which asset management system 100 employs a single reflected energy device 120, asset management system 200 of FIG. 2 utilizes at least four reflected energy devices 209, 221, 227 and 229. Here, the multiple reflected energy devices ensure that all surfaces of assets 104, 108 and 122 remain visible to energy signals from the reflected energy devices. Although not shown, each reflected energy device may itself be comprised of multiple reflected energy devices.

In FIG. 2, asset management system 200 also includes a zone of operation for each of anchor nodes 102, 112, 126 and 128. A zone of operation is a volume where aggregated node groups 106, 110 and 124 are enabled to communicate with anchor nodes 102, 112, 126 and 128. In this zone of operation, assets 104, 108 and 112 can also be scanned by reflected energy devices 209, 221, 227 and 229.

In operation, asset management system 200 is at an initial state. In this state, assets that are stationary are outside the zones of operation. Thus, as shown, assets 104 and assets 108 are stationary and are outside zone of operation 202 and zone of operation 212 respectively. Therefore, none of the reflected energy devices 209, 221, 227, and 229 receive energy reflected from assets 104 or 108.

Furthermore, in the initial state, device nodes of aggregated node groups 106, 110 and 124 are in a first or low power state. In one example, in this state, device nodes 106, 110 and 124 are not in communication with anchor nodes 102, 112, 126 and 128. In another example, in this low power state, device nodes are scheduled to communicate with anchor nodes 102, 112, 126 and 128 at specific predetermined intervals depending upon the expected movement of aggregated node groups 106, 110 and 124.

When more assets such as moving assets 112 enter into the zone of operation, the assets are switched to a higher power state. Such entry might be via a forklift (not shown) that engages pallet 107 to move assets 122 to another location. As shown, pallet 107 holding assets 122 is in motion and has moved from a position X that is outside zone of operation 228 to within zone of operation 228.

Upon assets 122 moving into zone of operation 228, at least one of reflected energy devices 209, 221, 227 or 229 transmits energy to aggregated node group 124 containing assets 122. The energy is then reflected back to reflected energy devices 209, 221, 227 or 229 to detect motion of assets 122. Each reflected energy device 209, 221, 227 and 229 has spatial and temporal discrimination so that motion can be detected adding in a securely transmitted signal that can be interpreted as an image or stream vs a known library or model by analyzing its output.

Specifically, in one example, the energy is transmitted by reflected energy device 221. This transmitted energy is then reflected from aggregated node group 124 and/or assets 122. The reflected energy is received by reflected energy device 221 to detect the movement/motion of aggregated node group 124 and assets 122.

In this example, when motion of aggregated node group 124/assets 122 is detected within zone of operation 228, the anchor node closest to zone of operation 228 is identified. Here, anchor node 128 is identified as the closest anchor node. In one example, asset management system 200 then utilizes anchor node 128 to relay state change instruction signals to change the operating states of device nodes of aggregated node group 124. In another example, it is reflected energy device 221 that is used to transmit state change instruction signals to change the operating states of device nodes of aggregated node group 124. In this example, the reflected energy device 221 may send power and signal to cause interruption to the state change circuitry of a device node. In this manner, in-band radio traffic is not increased.

Here, a first change state instruction signal can direct the device nodes of aggregated node group 124 to change from a low (or lower) power to state to a high (or higher) power state. In this higher power state, more frequent RSSI measurement may occur, and device identification and location information may be exchanged and communicated to anchor node 128 for storage or processing by computing resources at gateway 118.

In this high power state, device nodes of aggregated node group 124 are awake and begin more frequent communication with anchor node 128 (or an appropriate reflected energy device) including exchanging ID information with anchor node 128. The communication with anchor node 128 can be direct or via the mesh network. In turn, anchor node 128 measures the RSSI from each device node and between each device node. Anchor node 128 then forwards all of the information to gateway 118.

Gateway 118 uses the RSSI information and the known location of anchor node 128 (and other anchor nodes) to determine the location of aggregate node group 124 and all device nodes within the aggregate node group. The position of aggregate node group 124 may be determined based on its distance from known anchor nodes, each of which is used as a reference. Examples of techniques that can be used include RSSI, AOA, AOD, TOF. Thus, gateway 118 can determine how many corresponding assets there should be and whether an asset is missing.

Thus, the state change instruction signals cause communication resources to operate at a different power performance point. Communication resources can direct when and how device nodes are assigned to communicate wirelessly. A resource may include channel (frequency), future time windows—when communication is allowed and expected and/or radio power level which affects transmitted signal strength.

In FIG. 2, gateway 118 and/or external computer elements can implement holistic policies for asset management system 200 performance. For example, an application may require device nodes 124A, 124B and 124C to respond to a command to move to high power and frequent mesh network communications to be propagated to all aggregated node group 124 devices within n seconds.

With such centrally administered control, the present disclosure facilitates interrogation of the system's mesh network topology to determine the state-change-command latency (typical and worst case) for each device node under a given set of node power-performance operating points.

This change in power state may be temporary. After either a time-out or upon detection that movement of aggregated node group 124/assets has ceased, instructions to enter the low or lower power state are sent to the device nodes via a reflected energy device, an anchor node 128 or a communication device. Note that as used here, the communication device may itself be the reflected energy device or an anchor node or separate communication device that is part of the network and is in communication with the device nodes.

Specifically, upon detecting the state change event such as cessation of movement or upon a timeout, the appropriate device (anchor node 128, a reflected energy device or another communication device) may communicate a second change state instruction signal that directs the device nodes to enter a low (or lower) power state. In this manner, communication assets in play are adjusted dynamically allowing power to be used efficiently. Note that the device nodes can be given a program ability to execute a delayed state change command. Thus, after a commanded time interval, a device node can enter a different power state.

Figure 3:
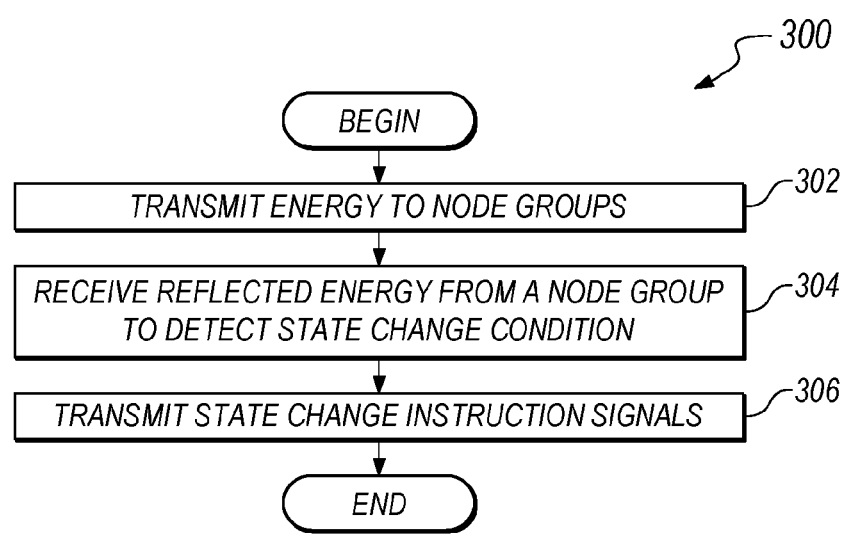
FIG. 3 illustrates a method for dynamically managing device power states according to an example of the present disclosure.

FIG. 3 illustrates method 300 for dynamically managing device node power states according to an example of the present disclosure.

In FIG. 3, at block 302, method 300 begins by transmitting energy to aggregated node group 124 (FIG. 2). Here, the energy may be transmitted by reflected energy device 221 (FIG. 2). Moreover, as previously noted, aggregated node group 124, which includes multiple device nodes 124A, 124B, . . . 124N, (FIG. 1), may be in motion. In this example, aggregated node group 124 and associated assets 122 are located on pallet 107 (FIG. 2). So, pallet 107 is moved by a forklift (not shown) from one location of warehouse 114 (FIG. 2) to another location.

At block 304, reflected energy from aggregated node group 124 and/or associated assets 122 is received by reflected energy device 221 to detect a state change event associated with aggregated node group 124. An example of a state change event is physical motion as in this case the movement of aggregated node group 124.

Another example of a state change event is the removal of an asset and corresponding device node (e.g., asset 122A/device node 124A) from assets 122. Yet, another example of a state change event is loss of communication from a device node when an associated asset becomes damaged.

In one example, upon detection of a state change event, a log or report that includes the state change event may be generated. The log may be generated and stored on an on aggregating routing node, anchor node or gateway anchor node. Alternatively, the log may be generated and transmitted via a gateway to a remote monitoring location. In this manner, monitoring of movement and detection of movement anomalies can be tracked. Moreover, by way of reporting out state change events, an external control system can manage lost (or unexpectedly added) assets from an aggregation. An example state change report might be as follows.

| Event Date | Type of Event | ID of Aggregated Node | Device Node ID | Anchor Node ID |
|---|---|---|---|---|
| Jan. 1, 2018 | Movement of Aggregated Group | 091444 | 0001-5000 | 2190 |
| Feb. 4, 2018 | Node Removal | 091143 | 10,000-15,000 | 2171 |

Although two event types are shown in the table above, the report may include additional or fewer events. The report may also include additional or fewer details for each event.

Here, the reflected energy sensed by reflected energy device 221 is used to aid in precisely determining the absolute position of aggregated node group 124 and associated assets. Reflected energy device 221 may include sensor devices such as an optical camera that uses computer vision techniques to generate spatial data, detect movement and to track aggregated node group 124.

In this example, assets of aggregated node group 124 may include patterned marks that are detectable by the optical camera. In one example, the motion of aggregated node group 124 can be detected by measuring change in speed or vector of aggregated node group 124. Any number of background subtraction techniques including adaptive median filtering, Running Gaussian Average, Gaussian Mixture Models or Prati Mediod may be applied to detect such motion, and to locate and track aggregated node group 124.

In another example, reflected energy device 221 might include a radar sensor, and an irradiating energy source may be a phased array of radar emitters with spatially controlled frequencies. The phased array might be steered toward a corresponding zone of operation. The number of transmit and receive antenna elements and the frequency of each antenna element might vary based on the size and layout of the warehouse involved. Note that image or streams of images received by the phased array may be used to securely map and control vs edge libraries.

In another example, reflected energy device 221 might incorporate an ultrasound transceiver that can emit and detect ultrasonic energy to detect and locate aggregated node group 124. A combination of different energy sensor types may be used in tandem where collectively, the reflected energy device's sensors collect sufficient information to locate and identify individual nodes in 3D spatial coordinates.

Thus, the present disclosure does not require the detection of state changes through devices that are within assets or device nodes. That is, the present assets/device nodes need not incorporate accelerometers, gyrometers or the like. Any such requirement would be a challenge because the device nodes would involve intelligence, which not only increases the cost of each asset unit but also reduces the lifespan of any on-board power supply. The present disclosure uses systems external to the device nodes and assets. In one example, the present systems can utilize existing building infrastructure. In dynamically managing power states of aggregated node groups, the present disclosure significantly reduces unit costs because device nodes and assets do not incorporate sensors translating to a reduction in asset costs.

At block 306, anchor node 128 relays a state change instruction signal to aggregated node group 124. In this example, when motion of aggregated node group 124/assets 122 is detected within zone of operation 228, anchor node 128—the anchor node closest to zone of operation 228—is used to relay the state change instruction signals. Note that the state change instruction signals need not be relayed by the anchor node. The state change instruction signals may instead be transmitted by reflected energy device 221 or another network communication device.

The state change instruction signals direct device nodes of aggregated node group 128 to change their operating states and enter a different power level. This state change instructional signal is propagated via a mesh network to the desired set or number of device nodes in aggregated node group 124.

A first change state instruction signal can direct the device nodes of aggregated node group 124 to change from a low (or lower) power state to a high (or higher) power state. In this higher power state, more frequent RSSI measurement may occur, and device identification and location information may be exchanged and communicated to anchor node 128 for storage or processing by computing resources at gateway 118.

After either a time-out or upon detection that movement by aggregated node group 124/assets 122 has ceased or upon detection of cessation of any other change state, anchor node 128 sends a change state instruction signal to aggregated node group 124 to enter a low or lower power state. This change state instruction signal is again propagated to the desired device nodes in aggregated node group 124.

In this manner, examples of the present disclosure can dynamically manage device node power states such that device nodes remain in a lower power state that consume little or no energy until a state change condition occurs. The system can therefore remain active and functional for many years without a loss in communication due to device node power supply failure.

Figure 4:
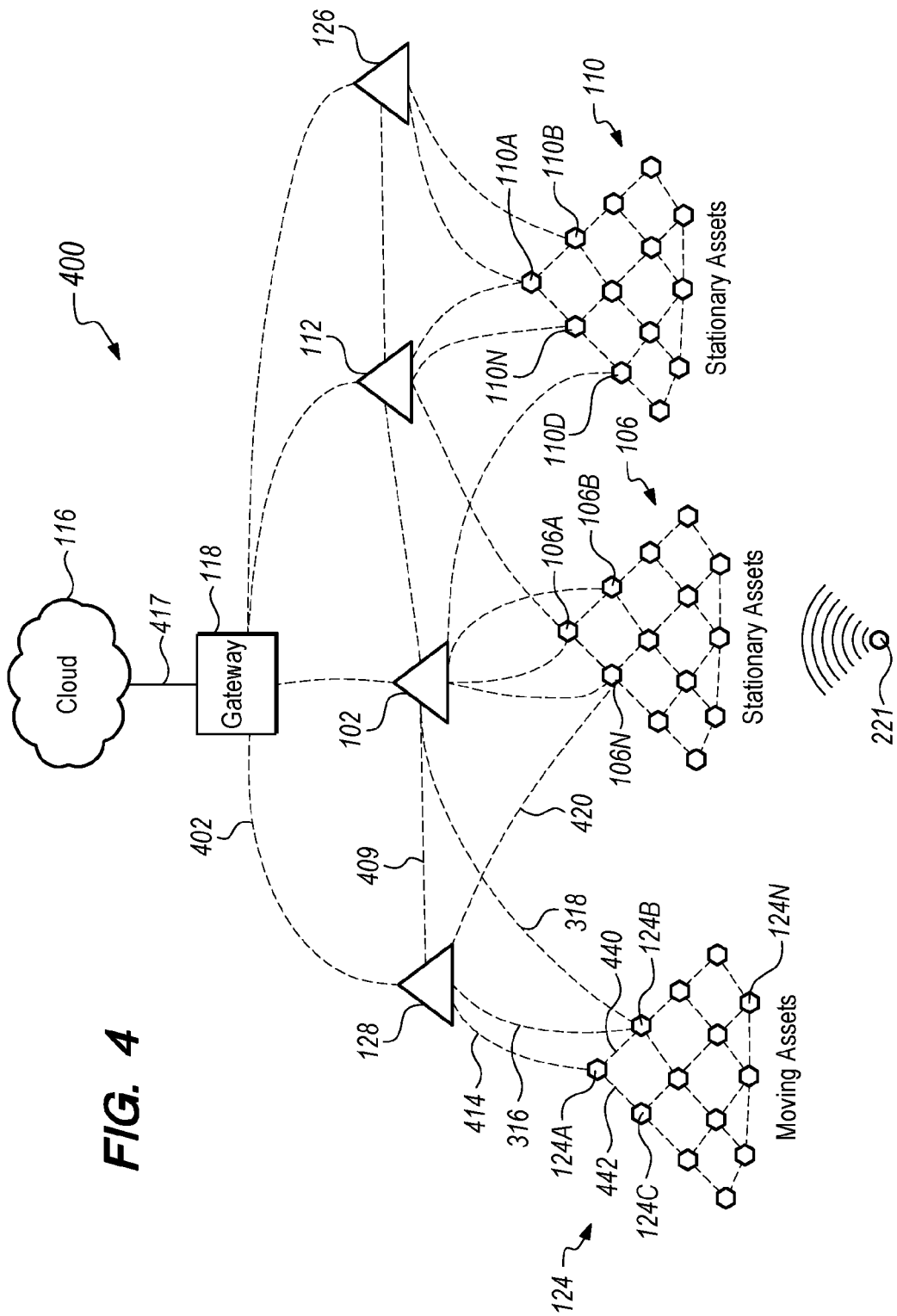
FIG. 4 illustrates an example mesh topology of the asset management system of FIG. 2.

FIG. 4 illustrates an example mesh topology 400 of asset management system 100 of FIG. 1.

In FIG. 4, mesh topology 400 includes gateway 118 and cloud 116 that are communicably coupled via a backbone 417. Gateway 118 and anchor nodes 128, 102, 112 and 126 are also communicably connected via a link 402. Thus, gateway 118 can communicate instructions to anchor nodes 128, 102, 112 and 126 to change the power states of relevant nodes, for example.

Not only are the anchor nodes communicably connected to gateway 118 and to each other (as permitted by transmission power/distance), the anchor nodes may also communicate with aggregated node groups within their zone or zones of operation. Thus, anchor nodes 128, 102, 112 and 126 may communicate with each other via link 409 or via gateway 118. Anchor node 128 may then communicate with aggregated node group 124 (e.g., device node 124A via link 414) and may further talk to another aggregated node group 106 (e.g. device node 106N via link 420).

This mesh topology allows communication between device nodes of an aggregated node group. For example, in aggregated node group 124, device node 124A and device node 124C can communicate via link 442. Device node 124A can also talk to device node 124B via link 440.

Device node 124B may communicate with device node 124N via any one of several multi-path links. This same inter-node connectivity is shared by device nodes in other aggregated node groups 106, 110 as shown in FIG. 4. In one example, communication between the device nodes is via Bluetooth LE; communication between device nodes and anchor nodes is also via Bluetooth LE.

Mesh network topology 400 thus provides inter-device communication to establish to optimum routing of messages. Each communication is spatially and temporarily synchronized to avoid channel collision. Each communication is also securely transmitted via authorization via images/streams of images vs edge libraries. This implementation is particularly beneficial where large nodes are physically aggregated as in the present example. In one example, about 5,000 device nodes and their associated assets are aggregated onto a pallet. The multi-path connections between the nodes also provides redundancy.

As previously noted, each device node has at least two power states: a low-power state and a high-power state. When motion is detected as previously described, gateway 118 directs anchor node 128 to send an instruction signal to aggregated node group 124. The instruction signal might direct at least one node to enter a higher or lower power state.

In the example of FIG. 4, the instruction signal may be received by device node 124A. In turn, device node 124A communicates that instruction to device node 124B. The instruction is then propagated with spatial and temporal synchronization to the entirety (if desired) until the last device node 124N is instructed. It is noted that the instruction can be different power state commands to different nodes in the aggregation. The device nodes don't have to all be directed to the same thing together. Mesh topology 400 also uses RSSI as a crude measure of inter-node proximity. Examples of other techniques that might be used include AOA, AOD, TOF or other painted direct mapping techniques.

In one example of the present disclosure, location is determined locally and no more than classifications results are sent to the cloud; data is not sent. Optionally, a log of state change events can be transmitted. For example, the log may indicate asset separation. The present disclosure is flexible and combines RSSI data with reflected energy device data to better manage assets' energy and to better track assets. Device nodes of the present disclosure can have multiple operating states trading off power and performance. The device nodes can be homogeneous or heterogenous.

Alternative Control Vector for Wakeup: The example above uses the mesh topology network 400 to propagate device node control commands that change the power-performance operating points of any (or all) device nodes in the mesh. A wakeup circuit may be employed to force a low state device node into an immediate communication state change in response to a detected external signal. This wakeup circuit can facilitate response to state change commands within a short time frame. In one example, a wakeup circuit might receive a signal from a broadcast component that uses a single channel (frequency) and the broadcast message is received by all device nodes. The message may contain a list of device node IDs as well as new operating points for each transmitted ID. The wakeup may be controlled by reflected energy device signals and or routed interrupt signals from a gateway.

Other wakeup type circuits are possible. For example, a wakeup circuit can address device nodes by targeting each device node wakeup circuit individually. This could be done by assigning every device node a unique reception frequency and individually tuning demodulation circuits on each asset.

Figure 5:
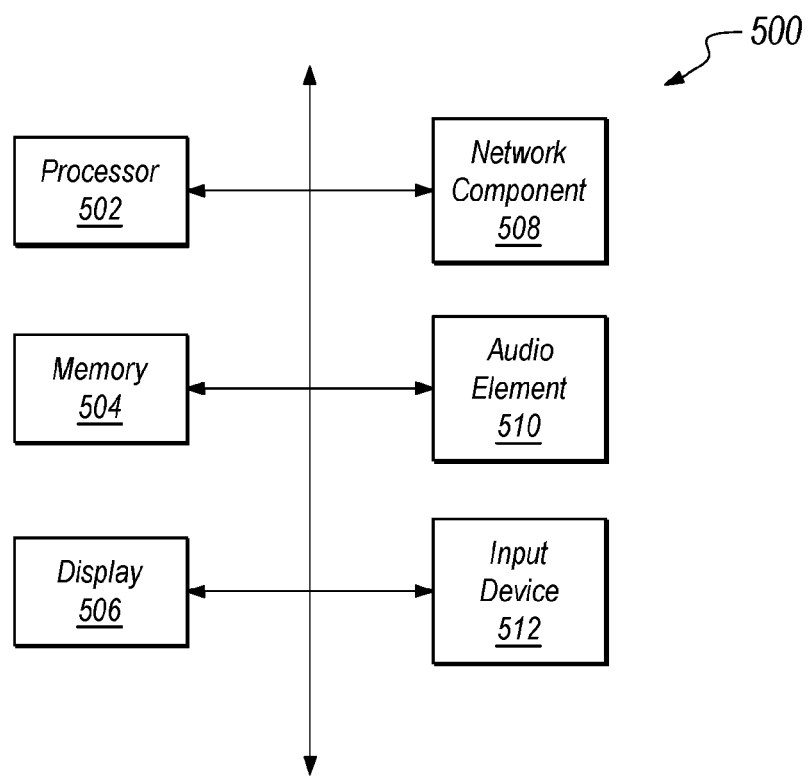
FIG. 5 illustrates a computer system architecture suitable for implementing examples or components to manage power states of aggregated node groups of the present disclosure.

FIG. 5 illustrates a computer system architecture suitable for implementing examples or components to manage power states of aggregated node groups of the present disclosure. System 500 may facilitate the tracking of assets associated with the aggregated node groups. System 500 may implement a gateway or an anchor node that instructs device nodes of the aggregated node group to enter a different power state.

When system 500 is implemented within an anchor node, for example, and motion of an aggregated node group is detected within a zone of operation, system 500 executes, under control of processor 502, machine executable software instructions stored in memory 504 to communicate or relay state change instruction signals to change the operating states of device nodes of aggregated node group. Here, memory device 504 might include various memory types, data storage, or non-transitory computer-readable storage media. A user may utilize input device 512 to execute a browser or other machine executable software instructions to facilitate communication of state change conditions according to the present disclosure.

A first change state instruction signal can direct the device nodes of aggregated node group to change from a first power to state to a second power state. In a higher power state, machine executable software instructions stored in memory 504 may be executed to exchange device identification and location information with computing resources at the gateway. The anchor node may be communicably coupled the gateway via network component 508. Display element 506 such as a touch screen interface may visually display logs of state change conditions that are encountered, and the logs may also be communicated to the gateway via network component 508. An audio alert of a state change condition may be delivered via audio element 510 such as speaker.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. A method comprising:
   transmitting energy, by a reflected energy device, onto an aggregated node group, wherein the aggregated node group includes a plurality of device nodes respectively physically integrated with a plurality of assets, wherein the aggregated node group is moveable from one location to another, and wherein the assets are physically clustered within the aggregated node group such that the assets move together as the a ted node group is moved;
   sensing, by the reflected energy device, the energy transmitted by the reflected energy device as has been reflected by the aggregated node group or the nodes thereof, to detect a state change event associated with the aggregated node group, wherein when the energy is reflected, the nodes are in a lower power state in which the nodes are in standby or sleep and do not communicate; and
   upon detection of the state change event, transmitting to the aggregated node group, a first change state instruction signal that directs at least one node of the aggregated node group to transition from the lower power state to a higher power state in which the at least one node is awake and communicates.

2. The method of claim 1 wherein the state change event is physical movement of the aggregated node group.

3. The method of claim 1 wherein the reflected energy device is external and spaced apart from the aggregated node group.

4. The method of claim 3 wherein a sensor of the reflected energy device is a radar device, an optical camera device, or an ultrasound device.

5. The method of claim 1 wherein the first change state instruction signal is transmitted by the reflected energy device or by an anchor node with known coordinates.

6. The method of claim 1 wherein the first change state instruction signal is propagated between individual nodes of the aggregated node group via a mesh network.

7. The method of claim 1 further comprising reporting out the state change event.

8. The method of claim 1 further comprising, subsequent to the at least one node transitioning to the higher power state, transmitting to the aggregated node group, by the reflected energy device or an anchor node, a second change state instruction signal that directs the at least one node to transition from the higher power state back to the lower power state.

9. A system comprising:
a reflected energy device to:
transmit energy onto a device node set including a plurality of device nodes respectively physically integrated with a plurality of assets, wherein the device node set is relocatable, and wherein the assets are physically clustered within the device node set such that the assets are relocated together as the device node set is relocated, and
sense the energy transmitted by the reflected energy device as has been reflected by the device node set, to identify a changed condition associated with the device node set, wherein when the energy is reflected, the nodes are in a first power state in which the nodes are in standby or sleep and do not communicate; and
a communication device to transmit a first communication signal to the device node set associated with the changed condition, wherein the first communication signal directs the device node set to change from the first power state to a second power state in which at least one node is awake and communicates.

10. The system of claim 9 wherein the reflected energy device comprises a radar device, an optical camera device, or an ultrasound device.

11. The system of claim 9 further comprising a mesh network, wherein the device nodes in the device node set communicate via the mesh network.

12. The system of claim 9 wherein the communication device is the reflected energy device or an anchor node to relay the first communication signal, wherein the anchor node is associated with a zone of operation.

13. The system of claim 12 wherein the mesh network uses RSSI (Received Signal Strength Indicator) data to determine a distance or position of the device nodes within the device node set.

14. The system of claim 9 wherein, subsequent to the device node set changing to the second power state, the communication device is to transmit a second communication signal to the device node set, wherein the second communication signal directs the device node set to change from the second power state to the first power state.

* * * * *